United States Patent
Cheng

(10) Patent No.: US 6,931,970 B2
(45) Date of Patent: Aug. 23, 2005

(54) ROLLER SHADE CUTTING MACHINE

(75) Inventor: Li-Ming Cheng, Kaohsiung Hsien (TW)

(73) Assignee: King Koon Industrial Corp., Kaohsiung (TW)

( * ) Notice: Subject to any disclaimer, the term of this patent is extended or adjusted under 35 U.S.C. 154(b) by 40 days.

(21) Appl. No.: 10/755,297

(22) Filed: Jan. 13, 2004

(65) Prior Publication Data

US 2005/0150337 A1    Jul. 14, 2005

(51) Int. Cl.$^7$ ............................................. B23B 5/14
(52) U.S. Cl. ..................... 82/101; 82/86; 82/83; 30/92
(58) Field of Search ............................. 82/46, 63, 70.2, 82/83, 86, 101, 173; 83/13, 373, 438; 30/92, 30/93, 96

(56) References Cited

U.S. PATENT DOCUMENTS 3,299,754 A * 1/1967 Hermann et al. ............. 82/98
3,756,098 A * 9/1973 Putz ............................. 82/117
3,772,762 A * 11/1973 Stark .......................... 29/401.1
6,742,423 B1 * 6/2004 Huang ......................... 82/101

* cited by examiner

Primary Examiner—Willmon Fridie, Jr.
(74) Attorney, Agent, or Firm—Rosenberg, Klein & Lee

(57) ABSTRACT

A roller shade cutting machine includes a base, a track assembly, a shade holder, a slat cutting device and a shade cutting device. The track assembly is mounted the base and includes a stationary track and an adjustable track with a ruler slidably mounted on the stationary track. The shade holder is mounted on the stationary track and has a rotating chuck to clamp a roller of the roller shade. The shade cutting device is mounted on the stationary track below the shade holder to cut the spinning roller. The slat cutting device is mounted on the stationary track and has a rolling cutter that is swiftly turned to cut a slat of the roller shade. Therefore, the cutting machine can be used to cut not only the roller but also the slat of the roller shade so that the machine is convenient to use.

11 Claims, 8 Drawing Sheets

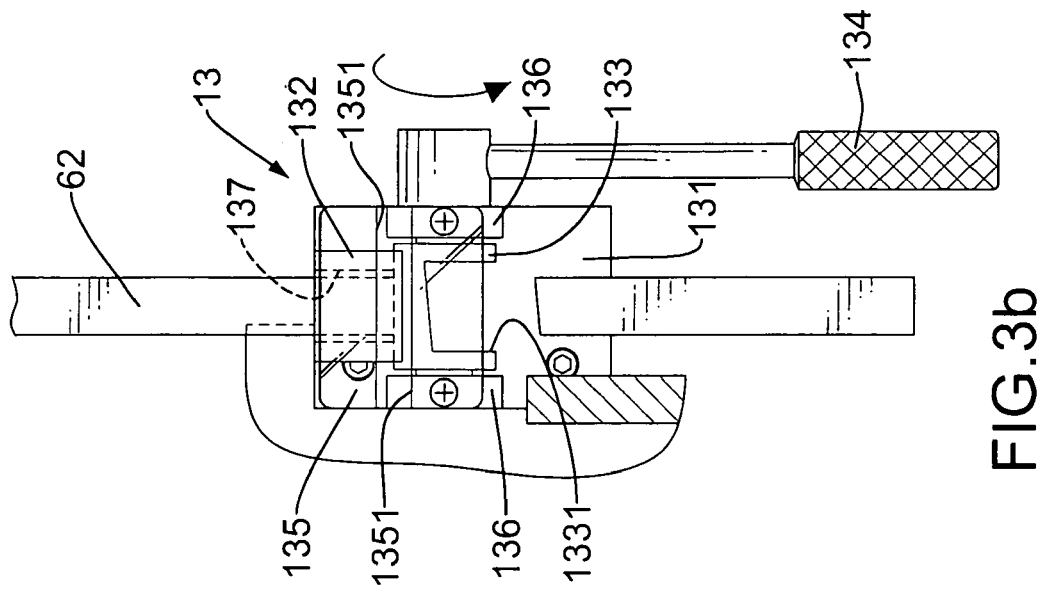
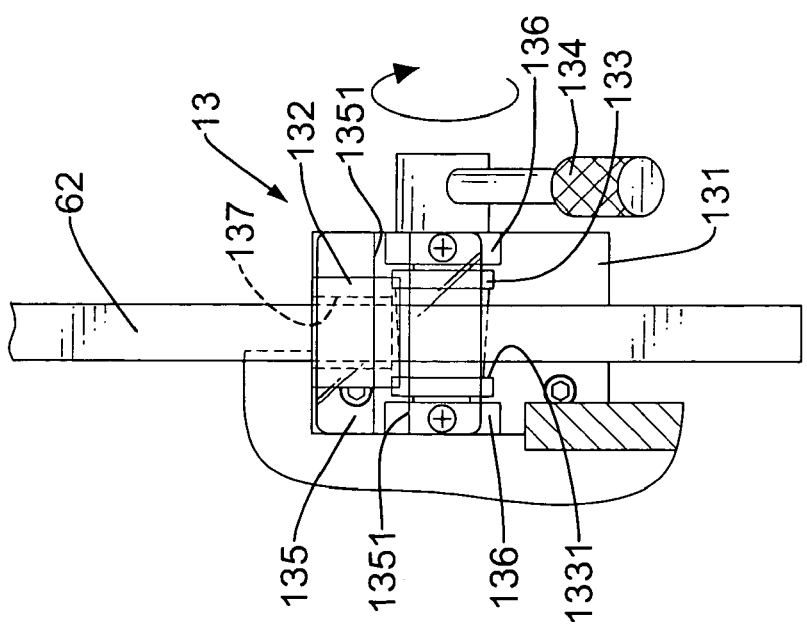
FIG.3b
FIG.3a

ROLLER SHADE CUTTING MACHINE

BACKGROUND OF THE INVENTION

1. Field of the Invention

The present invention relates to a window roller shade cutting machine, and more particularly to a latch-type cutting machine that can be used to cut both blinds and slats of window roller shades.

2. Description of Related Art

A window roller shade often needs to be trimmed to fit a window of a particular size. Generally, a window roller shade purchaser may measure the width of the window and takes the measurements to a store that sells the roller shades. The salesperson takes a roller shade and cuts the roller shade based on the provided measurements. A roller shade typically comprises a roller with a rolled blind and a wooden slat that are respectively made of different materials. Therefore, to cut the blinds and the slats needs different types of cutter.

A latch-type cutting machine may be found in a window roller shade store. However, the conventional cutting machine for a roller shade can be used to cut the blinds only. To cut the wooden slats requires the other machines or cutters. Therefore, it is inconvenient for the salesperson who needs to cut the roller shade because the salesperson must operate two kinds of cutting machines that may be located in different places.

Further, to operate such a latch-type cutting machine for the blinds needs an experienced person because the blinds of the roller shades must be precisely trimmed based on the provided measurements. If the roller shade is cut too short, the roller shade may be completely unacceptable to the purchaser. On the other hand, an insufficient cut of the roller shade will cause the roller shade to be too wide to fit the width of the window. In such a situation, the purchaser must go to the store again and ask the salesperson to cut the roller shade again after the purchaser initially returned home. This will waste time and money for the purchaser, as well as causing a lack of faith in the salesperson's skill.

Therefore, a cutting machine that can perform a task of cutting accurately and have a combined function of cutting both the rolled blinds and the slats is beneficial for not only the salesperson but also the purchaser. The present invention provides a cutting machine that can cut precisely the roller shade and has a combined function of cutting both the blinds and the slats to mitigate or obviate the aforementioned problems.

SUMMARY OF THE INVENTION

The main objective of the invention is to provide a cutting machine to cut a roller shade and the machine has a combined function of cutting both the rolled blinds and the slats such that the machine is convenient for a person who needs to cut the roller shade.

Another objective of the present invention is to provide a cutting machine to precisely cut a roller shade.

Other objectives, advantages and novel features of the invention will become more apparent from the following detailed description when taken in conjunction with the accompanying drawings.

BRIEF DESCRIPTION OF THE DRAWINGS

FIG. 3a is an operational front plan view of a slat cutting device of the cutting machine in FIG. 2 after a slat has been prepared for cutting;

FIG. 3b is an operational front plan view of the slat cutting device in FIG. 3a after the slat has been cut;

FIG. 4 is an enlarged side plan view of a shade holder, a shade cutting device and a power assembly of the cutting machine in FIG. 2 and the slat cutting device in FIG. 3a;

DETAILED DESCRIPTION OF PREFERRED EMBODIMENT

Figure 1:
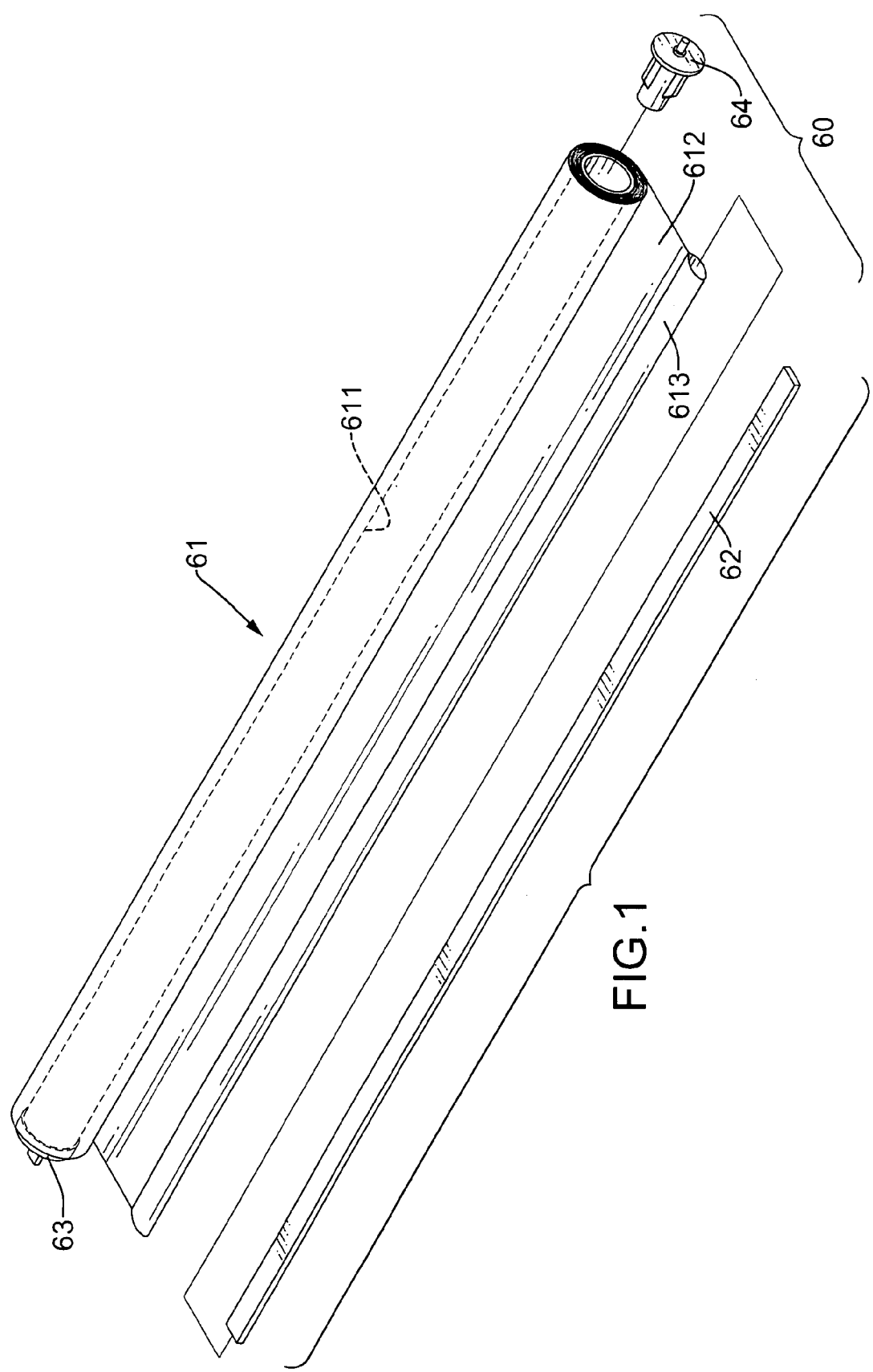
FIG. 1 is an enlarged exploded perspective view of a roller shade.
Figure 2:
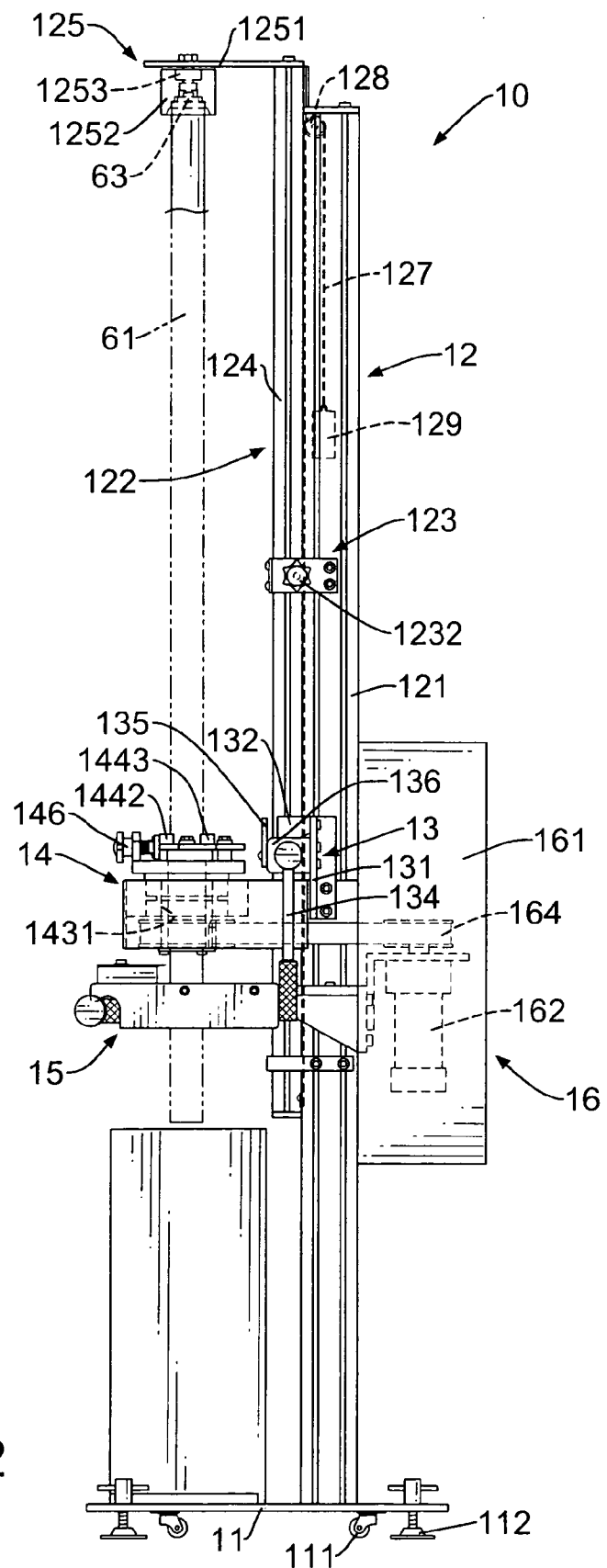
FIG. 2 is a side plan view of a cutting machine in accordance with the present invention.

With reference to FIGS. 1 and 2, a cutting machine (10) in accordance with the present invention is used to cut and trim a window roller shade (60) to a proper size so that the roller shade (60) can fit a window (not shown) of a particular size. Generally, the roller shade (60) comprises a roller (61), a slat (62), a flat pin end cap (63) and a demountable round pin end cap (64). The roller (61) has a proximal end (not numbered) and a distal end (not numbered) and comprises a core (611) and a rolled blind (612). The blind (612) is wrapped around the core (611) and has a bottom edge (not numbered) and a hem (613). The hem (613) is formed at the bottom edge of the blind (612) to hold the slat (62). The flat pin end cap (63) is fastened at the distal end. The round pin end cap (64) is detachably mounted at the proximal end. If a person needs to trim the roller shade (60), the person must firstly remove the slat (62) from the hem (613) and the round pin end cap (64) from the proximal end of the roller (61).

Figure 8:
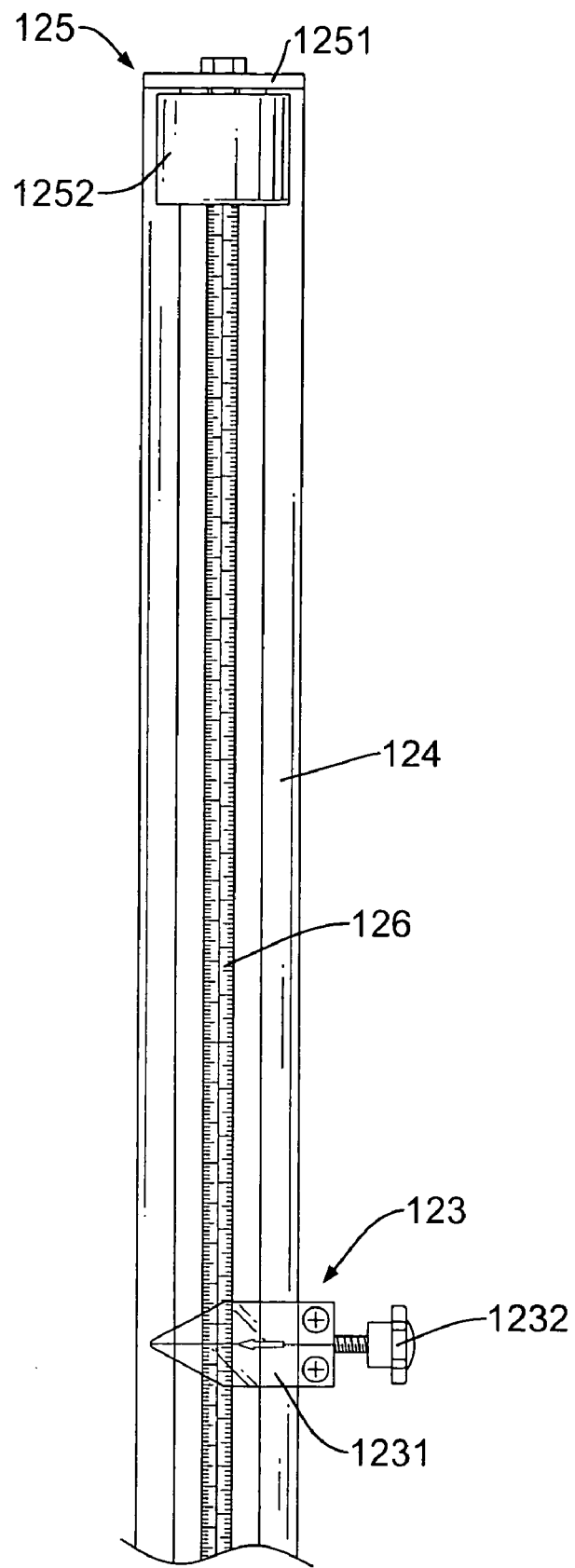
FIG. 8 is an enlarged front plan view of an indicating device of the cutting machine in FIG. 2.

With reference to FIGS. 2 and 8, the roller cutting machine (10) in accordance with the present invention comprises a base (11), a track assembly (12), a slat cutting device (13), a shade holder (14), a shade cutting device (15) and a power assembly (16). The base (11) has a top (not numbered) and a bottom (not numbered) and comprises multiple cart wheels (111) and feet (112) that can be selectively used to stand the whole machine on the ground. The track assembly (12) is mounted on the top of the base (11) and comprises a stationary track (121), an adjustable track (122), an indicating device (123) and a balancing pulley assembly (not numbered). The stationary track (121) is mounted vertically on the top of the base (11) and has a top end (not numbered), a bottom end (not numbered) and an inner space (not numbered). The bottom end is fastened on the top of the base (11).

The adjustable track (122) is slidably mounted on the stationary track (121) and comprises an adjustable bar (124), a top shade holder (125) and a ruler (126). The adjustable bar (124) is slidably mounted on the stationary track (121) and has a top end (not numbered), a bottom end (not numbered) and a front (not numbered). The top shade holder (125) is attached at the top end of the adjustable bar (124) and comprises a top bracket (1251), a rolling holder (1252) and a bearing (1253). The top bracket (1251) is attached at the top end of the adjustable bar (124) and has an outside end (not numbered). The rolling holder (1252) is rotatably mounted on the top bracket (1251) at the outside end by means of the bearing (1253) and has a bottom recess (not numbered) to hold the flat pin end cap (63) in the roller (61). The rotatable rolling holder (1252) that firmly holds the flat pin end cap (63) of the roller (61) permits the roller (61) to be smoothly rotated as the roller (61) is being cut so that the roller (61) to be cut precisely. The use of the bearing (1253) helps to reduce the friction between the rolling holder (1252) that firmly holds the flat pin end cap (63) and the top bracket (1251) of the top shade holder (125). The reduction of friction ensures a firm and stable grip on the roller (61), which produces consistently precise cut. The ruler (126) is attached to the front of the adjustable bar (124) and is used to measure the required length of the roller (61). Therefore, it is convenient to use the cutting machine (10) to cut the roller shade (60) to acquire a proper length.

The indicating device (123) is fastened on the stationary track (121) and comprises an indicator (1231) and a locking knob (1232). The indicator (1231) comprises a stationary segment (not numbered) and an indicating segment (not numbered). The stationary segment is fastened on the stationary track (121). The indicating segment perpendicularly protrudes from the stationary segment and is mounted in front of the ruler (126) to indicate a scale of the ruler (126). The locking knob (1232) is rotatably mounted on the stationary segment at a position corresponding to the adjustable bar (124). The locking knob (1232) can be rotated extending into the stationary segment to interlock the adjustable bar (124) with the stationary track (121) in position.

The balancing pulley assembly is mounted in the stationary track (121) and comprises a cord (127), a pulley (128) and a balancing weight (129). The pulley (128) is mounted at the top end of the stationary track (121). The cord (127) partially rolls on the pulley (128) and has an inside end (not numbered) and an outside end (not numbered). The outside end connects to the bottom end of the adjustable bar (124). The inside end extends into the inner space of the stationary track (121) and connects to the balancing weight (129). The balancing weight (129) is movably mounted in the inner space of the stationary track (121) to provide a balanced state of the adjustable bar (124). The use of the balancing weight (129) is used to offset the heavy weight of the adjustable bar (124) in which a little force is required to raise or lower the adjustable bar (124) relative to the stationary track (121) for adjusting the height of the adjustable bar (124) for cutting. Therefore, the adjustable bar (124) will not fall when the locking knob (1232) has not yet interlocked with the adjustable bar (124). In addition, since the adjustable bar (124) moves along the stationary track (124) in vertical path, there is no deviation or unevenness when adjusting the adjustable bar (124) upward or downward, which produces a straight and precise cut. The adjustable bar (124) is convenient to adjust.

With reference to FIGS. 2, 3a and 3b, the slat cutting device (13) is mounted on the stationary track (121) and comprises a mounting bracket (131), a slat guiding block (132), a rolling cutter (133), a handle (134) and a transparent cover (135). The mounting bracket (131) is fastened on the stationary track (121) and has two parallel wings (136) each of which has a distal end (not numbered) and is protruded toward the front of the adjustable bar (124). The slat guiding block (132) is mounted on the mounting bracket (131) and between the wings (136), and has a longitudinal through hole (137) and a curved bottom (not numbered). The rolling cutter (133) is rotatably mounted between the wings (136) and has a cutting recess (1331) and an exterior periphery (not numbered). The cutting recess (1331) is defined in the exterior periphery and is aligned with the longitudinal through hole (137). The exterior periphery is partially flush with the curved bottom of the slat guiding block (132). The handle (134) connects to the rolling cutter (133) outside one of the wings (126) to rotate the rolling cutter (133) to change an angular position of the cutting recess (1331). The cover (135) is attached to the distal ends of the wings (136) and has two parallel basis lines (1351) respectively formed above and below the curved bottom of the slat guiding block (132).

To operate the slat cutting device (13) to cut the slat (62), the person must measure and mark a line (not shown) across the slat (62) at a place where it needs to be cut. The handle (134) is lifted to about 90 degrees relative to the vertical direction in order to align the cutting recess (1331) in the rolling cutter (133) with the longitudinal through hole (137) in the slat guiding block (132). The slat (62) is inserted into the longitudinal through hole (137) by centering the marking line on the slat (62) between the basis lines (1351). The handle (134) is then swiftly turned downwards by a user for a precise cut of the slat (134) to complete the cutting operation for the slat (62).

Figure 4:
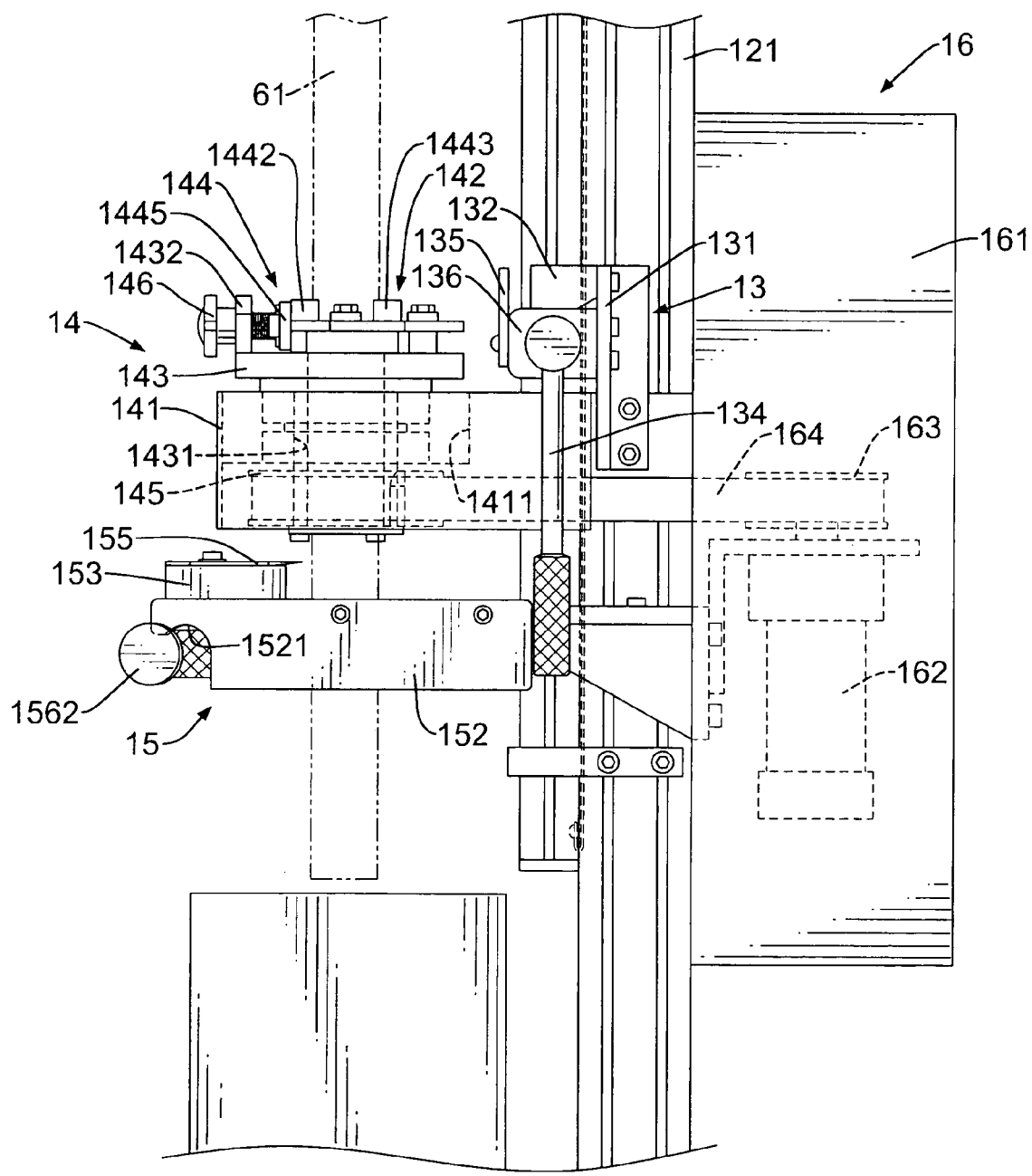
Figure 5:
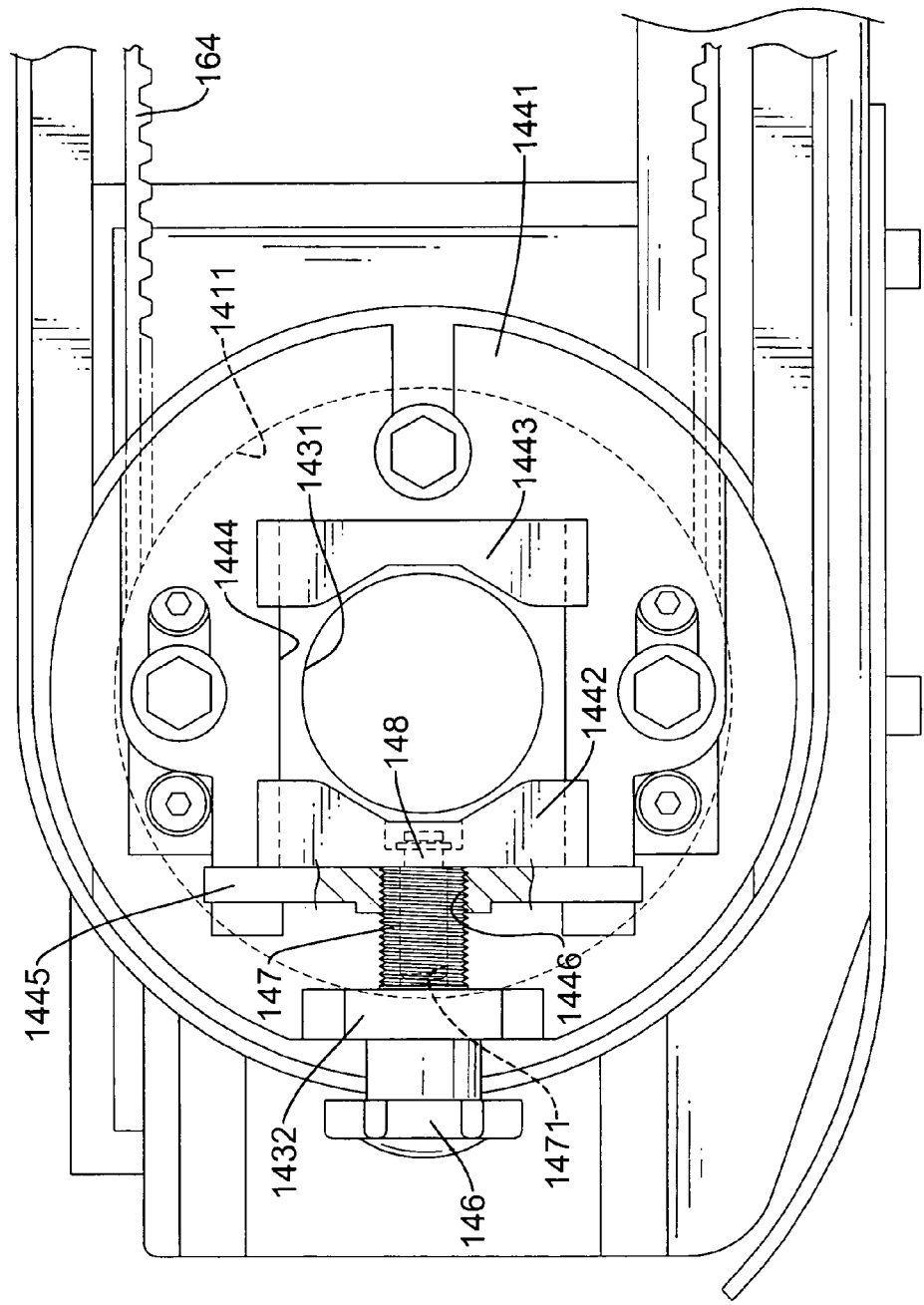
FIG. 5 is an enlarged top plan view of the shade holder of the cutting machine in FIG. 2.
Figure 6:
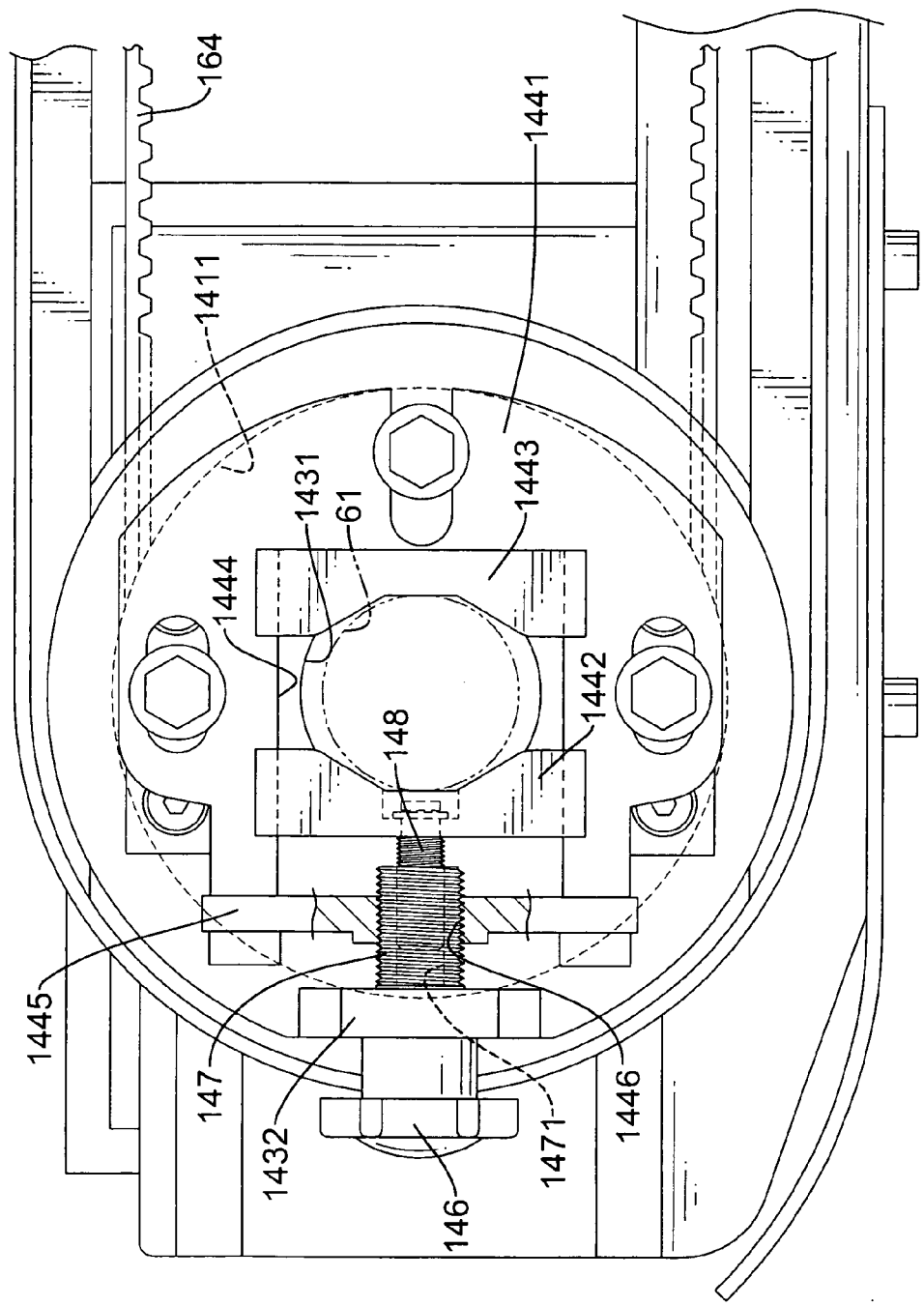
FIG. 6 is an enlarged operational top plan view of the shade holder in FIG. 5 when the shade holder firmly clamps a roller of the roller shade in FIG. 1.

With reference to FIGS. 4, 5 and 6, the shade holder (14) is mounted on the stationary track (121) and comprises a stationary base (141) and a rotatable chuck (142). The stationary base (141) is fastened on the stationary track (121) and has a longitudinal through hole (1411). The chuck (142) is rotatably mounted in the through hole (1411) and comprises a turning table (143), a clamping device (144) and a driven pulley wheel (145). The turning table (143) is rotatably mounted in the through hole (1411) of the stationary base (141) and has a top (not numbered), a bottom (not numbered), a central through hole (1431) and an outside knob holder (1432). The central through hole (1431) is defined through the top, is aligned with the rolling holder (1252) and has a center (not numbered). The driven pulley wheel (145) is mounted on the bottom of the turning table (143). The outside knob holder (1432) is formed on the top of the turning table (143).

The clamping device (144) is mounted on the top of the turning table (143) and comprises a movable base (1441), an adjusting device (not numbered), a first jaw (1442) and a second jaw (1443). The movable base (1441) is slidably mounted on the top of the turning table (143) and has a top (not numbered), a slot (1444) and an inside knob holder (1445). The slot (1444) is defined through the top and corresponds to the central through hole (1431) of the turning table (143). The inside knob holder (1445) is mounted on the top of the movable base (1441) across the slot (1444), is parallel to the outside knob holder (1432) and has a transverse threaded hole (1446).

The adjusting device is rotatably mounted on the outside knob holder (1432) and comprises a clamping knob (146), a threaded external shank (147) and a threaded internal shank (148). The threaded external shank (147) screws into the transverse threaded hole (1446) of the inside knob holder (1445) and has an exterior thread (not numbered), an inside end (not shown), an outside end (not numbered) and a longitudinal threaded hole (1471). The inside end connects to the clamping knob (146) and is rotatably held in the outside knob holder (1432). The outside end screws into the transverse threaded hole (1446) of the inside knob holder (1445). The longitudinal threaded hole (1471) has an interior thread (not numbered). The threaded internal shank (148) has an exterior thread (not numbered) and an outside end (not numbered). The exterior thread of the threaded internal shank (148) is counter to the exterior thread on the threaded external shank (147) and screws with the interior thread on the longitudinal threaded hole (1471). For example, if the exterior thread on the threaded external shank (147) is a right-hand thread, the exterior thread of the threaded internal shank (148) is a left-hand thread. The outside end of the threaded interior shank (148) connects to the first jaw (1442).

The first jaw (1442) is slidably received in the slot (1444) of the movable base (1441) and is selectively pulled and pushed by the outside end of the threaded interior shank (148). The second jaw (1443) is fastened on the movable base (1441) and is parallel to the first jaw (1442). The first and the second jaws (1442, 1443) are diametrically mounted outside the central through hole (1431) of the turning table (143). Therefore, the first and the second jaws (1442, 1443) are moved to approach the center of the central through hole (1431) to complete a self-centering movement as turning the clamping knob (146) rotates the external and the internal threaded shanks (147, 148) in different directions.

When the threaded external shank (147) is rotated, the revolutions of the threaded external shank (147) will pull the movable base (1441) towards the outside knob holder (1432), which will simultaneously move the second jaw (1443) towards the center of the central through hole (1431). Meanwhile, the outside end of the threaded internal shank (148) extends out of the longitudinal threaded hole (1471) of the threaded external shank (147) and pushes the first jaw (1442) toward the center of the central through hole (1431). Therefore, the roller (61) can be concentrically clamped by the two jaws (1442, 1443).

Figure 7:
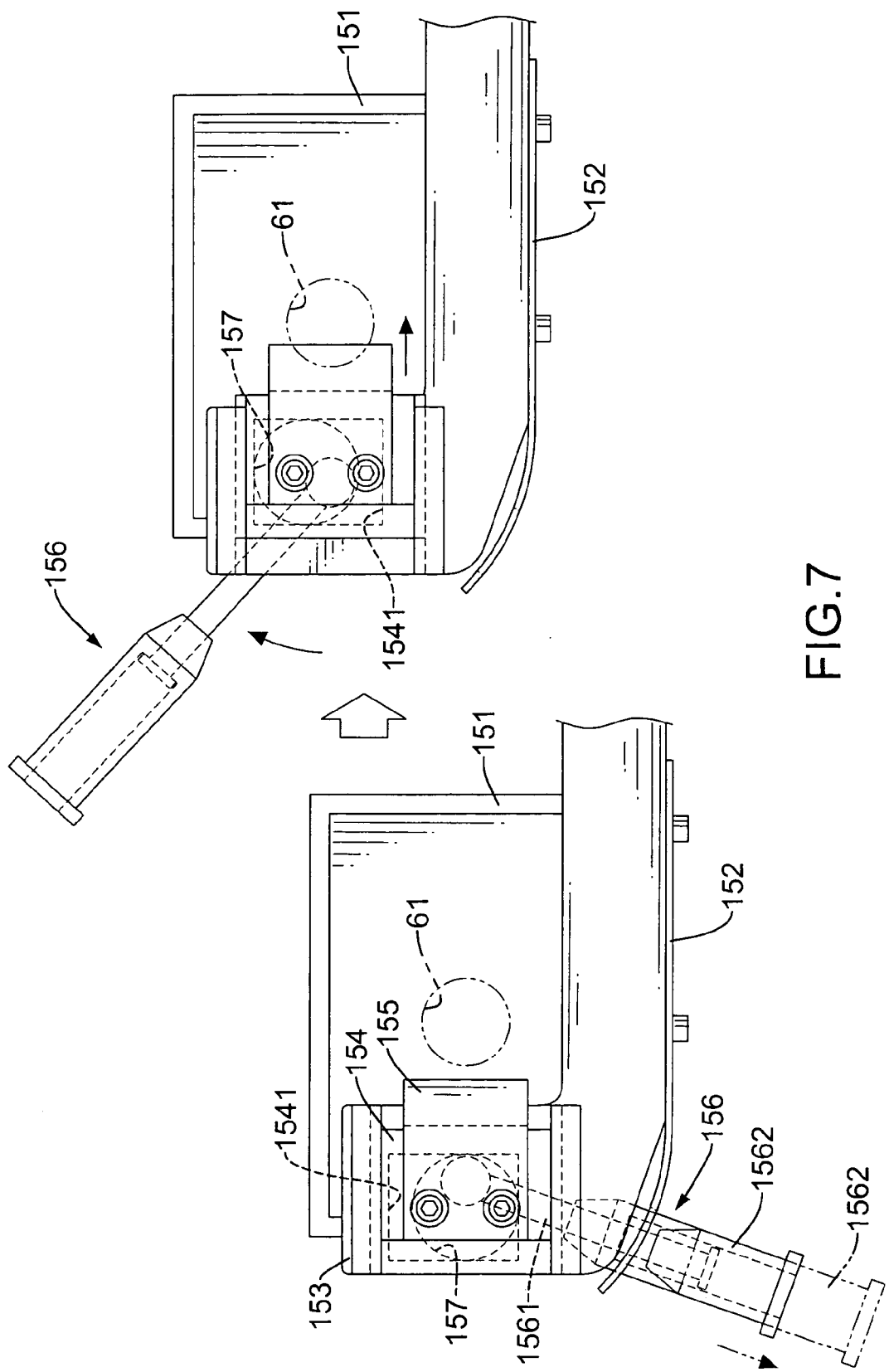
FIG. 7 is an enlarged operational top plan view of the shade cutting device when a cutting blade is cutting the roller in FIG. 6.

With reference to FIGS. 4 and 7, the shade cutting device (15) is mounted on the stationary track (121) below the stationary base (141) of the shade holder (14) and comprises a cutter mounting frame (151), a side cover (152), a cutter stationary block (153), a cutter sliding block (154), a cutting blade (155), a cutting handle (156) and a cutter feeding disk (157). The cutter mounting frame (151) is fastened on the stationary track (121) and has a top (not numbered) and a side (not numbered). The side cover (152) is attached to the side of the cutter mounting frame (151) and has a handle slot (1521). The cutter stationary block (153) is mounted on the top of the cutter mounting frame (151) and has a top (not numbered). The cutter sliding block (154) is slidably mounted on the top of the cutter stationary block (153) and has a top (not numbered), a bottom (not numbered) and a rectangular recess (1541). The recess (1541) is defined in the bottom and has four edges (not numbered). The cutting blade (155) is demountably mounted on the top of the cutter sliding block (154) at a position as a datum for the ruler (126), which means the position of the cutting blade (155) is the zero degree of the ruler (126). The feeding disk (157) is rotatably mounted in the recess (1541) in the cutter sliding block (154) and has an eccentric portion (not numbered). The eccentric portion abuts three of the edges of the recess (1541). The cutting handle (156) connects to the feeding disk (157) to rotate the eccentric portion and comprises a connecting bar (1561) and a safety handle sleeve (1562). The connecting bar (1561) has an inside end (not numbered) and an outside end (not numbered). The inside end is eccentrically connected to the feeding disk (157) to form the eccentric portion. The outside end extends through the handle slot (1521). The handle sleeve (1562) is retractably mounted on the outside end of the connecting bar (1561) and engages the handle slot (1521) to hold the cutting handle (156) in position. In such a state, the cutting handle (156) cannot be rotated to feed the cutting blade (155) to prevent the cutting blade (155) from being unintentionally cut.

With reference to FIG. 4, the power assembly (16) is mounted on the stationary track (121) and comprises a control box (161), an actuator (162), a drive pulley wheel (163) and a pulley belt (164). The control box (161) is mounted on the stationary track (121) and electrically connects to the actuator (162). The actuator (162), such as a motor with a shaft is mounted on the stationary track (121). The drive pulley wheel (163) is mounted on the motor shaft and is rotated by the motor shaft. The pulley belt (164) connects the drive pulley wheel (163) to the driven pulley wheel (145) to transmit power to spin the rotatable chuck (142) as the actuator (162) is powered on. With reference to FIGS. 2 to 7, when cutting machine (10) is used to cut the roller (61), the first step is to loosen the locking knob (1232) of the indication device (123) to adjust the adjustable bar (124) to obtain the same length as the desired length of the roller (61). For example, if the roller (61) is to be 72 inches long, then the adjustable bar (124) is adjusted to make sure the bar measurement points at the 72 inch mark on the ruler (126) by the indicator (1231). The next step is to loosen the clamping knob (146) of the clamp device (144) to permit the proximal end of the roller (61) to extend into the opening between the first and the second jaws (1442, 1443), and eventually extend out of the central through hole (1431) of the turning table (143). The third step is to insert the distal end of the roller (61) with the flat pin end cap (63) into the bottom recess of the rolling holder (1252) and firmly push the roller (61) up against rolling holder (1252) after the round pin end cap (64) has been removed. Now, the clamping knob (146) is turned to tighten to first and the second jaws (1442, 1443) to firmly clamp around the roller (61). The next step is to power on the actuator (162) by means of the control box (161). As the actuator (162) spins the roller (61), the handle sleeve (1562) is pulled outward to disengage the handle slot (1521), which allows the cutting handle (156) to be turned. Then, the cutting handle (156) is pulled firmly to rotate the eccentric portion of the feeding disk (157) against the edges of the rectangular recess (1541) of the cutter sliding block (154) to move the cutting blade (155) toward the spinning roller (61), whereby the spinning roller (61) is cut. After the cutting operation is completed, it is necessary to stop the actuator (162) and remove the roller (61) from the shade holder (14). The final step is to return the cutting handle (156) to its original position.

After the cutting operations for the roller (61) and the slat (62) have been finished, the round pin end cap (64) and the slat (62) are reinserted into the roller (611) and the hem (613) to achieve a correctly sized window roller shade. Since the roller (61) and the slat (62) can be cut in the same machine, it is convenient for the salesperson to trim the roller shade. Furthermore, the adjustable bar (124) contains the ruler (126) that is an aid for the measurements of the roller (61) and a precise cut for the roller (61). Consequently, the cutting machine (10) in accordance with the present invention is not only convenient but also helpful for cutting and trimming the roller shade to a particular size.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A roller shade cutting machine comprising:
   a base having a top and a bottom;
   a track assembly mounted on the top of the base and comprising
      a stationary track mounted vertically on the top of the base and having a top end and a bottom end fastened on the top of the base;
      an adjustable track slidably mounted on the stationary track and comprising an adjustable bar with a top end, a bottom end and a front slidably mounted on the stationary track, a top shade holder attached at the top end of the adjustable bar and having a rolling holder, and a ruler attached to the front the adjustable bar; and
      an indicating device mounted on the stationary track to indicate a scale of the ruler and interlock the adjustable bar with the stationary track in position;
   a slat cutting device mounted on the stationary track;
   a shade holder mounted on the stationary track and comprising
      a stationary base fastened on the stationary track and having a longitudinal through hole; and
      a chuck rotatably mounted in the longitudinal through hole of the stationary base and comprising
         a turning table rotatably mounted in the longitudinal through hole of the stationary base and having a top, a bottom, a central through hole with a center defined through the top and the bottom of the turning table and aligned with the rolling holder; and
         a clamping device mounted on the top of the turning table and having a first jaw and a second jaw that are self-centering toward the center of the central through hole of the turning table;
   a shade cutting device mounted on the stationary track below the stationary base of the shade holder and comprising
      a cutter mounting frame fastened on the stationary track and having a top;
      a cutter stationary block mounted on the top of the cutter mounting frame and having a top;
      a cutter sliding block slidably mounted on the top of the cutter stationary block and having a top;
      a cutting blade demountably mounted on the top of the cutter sliding block at a position being a datum for the ruler; and
      a cutting handle connected to the cutting sliding block to move the cutting blade to cut; and
   a power assembly mounted on the stationary track to spin the turning table.

2. The roller shade cutting machine as claimed in claim 1, wherein
   the turning table further has an outside knob holder formed from the top of the turning table; and
   the clamping device further comprises
      a movable base slidably mounted on the top of the turning table and having a top, a slot defined through the top and corresponding to the central through hole of the turning table and an inside knob holder mounted on the top of the movable base, being parallel to the outside knob holder and having a transverse threaded hole; and
      an adjusting device rotatably mounted on the outside knob holder and the inside knob holder;
   wherein the first jaw is slidably in the slot of the movable base, the second jaw is fastened on the movable base and is parallel to the first jaw and the adjusting device connects to both the first jaw and the movable base to move the jaws toward the center of the central through hole of the turning table.

3. The roller shade cutting machine as claimed in claim 2, wherein the adjusting device comprises
   a threaded external shank with an exterior thread screwed into the transverse threaded hole of the inside knob holder and having an inside end rotatably held in the outside knob holder, an outside end and a longitudinal threaded hole with an interior thread defined in the outside end;
   a threaded internal shank with an exterior thread screwed in the longitudinal threaded hole of the threaded external shank and having an outside end connecting to the first jaw; and
   a clamping knob rotatably mounted in the outside knob holder and attached to the inside end of the threaded external shank to rotate the threaded external shank;
   wherein the exterior thread of the threaded external shank is counter to the exterior thread of the threaded internal shank.

4. The roller shade cutting machine as claimed in claim 1, wherein
   the cutter mounting frame of the shade cutting device further has a side;
   the cutter sliding block of the shade cutting device further has a bottom and a rectangular recess defined in the bottom, and the rectangular recess has four edges;
   the shade cutting device further comprises
      a side cover attached to the side of the cutter mounting frame and having a handle slot; and
      a feeding disk rotatably mounted in the rectangular recess in the cutter sliding block and having an eccentric portion selectively abutting three of the edges of the rectangular recess; and
   the cutting handle comprises
      a connecting bar having an inside end eccentrically connected to the feeding disk to form the eccentric portion and an outside end extended through the handle slot; and
      a safety handle sleeve retractably mounted on the outside end of the connecting bar and engaged with the handle slot to hold the cutting handle in position.

5. The roller shade cutting machine as claimed in claim 3, wherein
   the cutter mounting frame of the shade cutting device further has a side;
   the cutter sliding block of the shade cutting device further has a bottom and a rectangular recess defined in the bottom, and the rectangular recess has four edges;
   the shade cutting device further comprises
      a side cover attached to the side of the cutter mounting frame and having a handle slot; and
      a feeding disk rotatably mounted in the rectangular recess in the cutter sliding block and having an eccentric portion selectively abutting three of the edges of the rectangular recess; and
   the cutting handle comprises
      a connecting bar having an inside end eccentrically connected to the feeding disk to form the eccentric portion and an outside end extended through the handle slot; and
      a safety handle sleeve retractably mounted on the outside end of the connecting bar and engaged with the handle slot to hold the cutting handle in position.

6. The roller shade cutting machine as claimed in claim 1, wherein the chuck further comprises a driven pulley wheel mounted on the bottom of the turning table; and the power assembly comprises
a control box mounted on the stationary track;
an actuator electrically connected to the control box;
a drive pulley wheel rotated by the actuator; and
a pulley belt connecting the drive pulley wheel to the driven pulley wheel to transmit power outputted by the actuator to spin the chuck.

7. The roller shade cutting machine as claimed in claim 5, wherein the chuck further comprises a driven pulley wheel mounted on the bottom of the turning table; and the power assembly comprises
a control box mounted on the stationary track;
an actuator electrically connected to the control box;
a drive pulley wheel rotated by the actuator; and
a pulley belt connecting the drive pulley wheel to the driven pulley wheel to transmit power outputted by the actuator to spin the chuck.

8. The roller shade cutting machine as claimed in claim 1, wherein the slat cutting device comprises a mounting bracket fastened on the stationary track and having two parallel wings protruded toward the front of the adjustable bar, each of the wings having a distal end;
a slat guiding block mounted on the mounting bracket between the wings and having a longitudinal through hole and a curved bottom;
a rolling cutter rotatably mounted on the wings and having an exterior periphery being flush with the curved bottom of the slat guiding block and a cutting recess defined in the exterior periphery and aligned with the longitudinal through hole of the slat guiding block;
a handle connected to the rolling cutter outside the wings to rotate the rolling cutter; and
a transparent cover attached to the distal ends of the wings and having two parallel basis lines respectively formed above and below the curved bottom of the slat guiding block.

9. The roller shade cutting machine as claimed in claim 7, wherein the slat cutting device comprises a mounting bracket fastened on the stationary track and having two parallel wings protruded toward the front of the adjustable bar, each of the wings having a distal end;
a slat guiding block mounted on the mounting bracket between the wings and having a longitudinal through hole and a curved bottom;
a rolling cutter rotatably mounted on the wings and having an exterior periphery being flush with the curved bottom of the slat guiding block and a cutting recess defined in the exterior periphery and aligned with the longitudinal through hole of the slat guiding block;
a handle connected to the rolling cutter outside the wings to rotate the rolling cutter; and
a transparent cover attached to the distal ends of the wings and having two parallel basis lines respectively formed above and below the curved bottom of the slat guiding block.

10. The roller shade cutting machine as claimed in claim 1, wherein the stationary track further has an inner space; and the track assembly further comprises a balancing pulley assembly mounted in the stationary track, and the balancing pulley assembly comprising
a pulley mounted at the top end of the stationary track;
a cord partially rolling on the pulley and having an outside end connected to the bottom end of the adjustable bar and an inside end extended into the inner space of the stationary track; and
a balancing weight connected to the inside end of the cord and movably mounted in the inner space of the stationary track to provide a balanced state of the adjustable bar.

11. The roller shade cutting machine as claimed in claim 9, wherein the stationary track further has an inner space; and the track assembly further comprises a balancing pulley assembly mounted in the stationary track, and the balancing pulley assembly comprising
a pulley mounted at the top end of the stationary track;
a cord partially rolling on the pulley and having an outside end connected to the bottom end of the adjustable bar and an inside end extended into the inner space of the stationary track; and
a balancing weight connected to the inside end of the cord and movably mounted in the inner space of the stationary track to provide a balanced state of the adjustable bar.

* * * * *